United States Patent
Iwamura

(10) Patent No.: US 10,598,519 B2
(45) Date of Patent: Mar. 24, 2020

(54) OPTICAL FIBER STRAIN MEASUREMENT APPARATUS AND OPTICAL FIBER STRAIN MEASUREMENT METHOD COMPRISING A TRANSMITTER-SIDE OPTICAL BANDPASS FILTER

(71) Applicant: Oki Electric Industry Co., Ltd., Tokyo (JP)

(72) Inventor: Hideyuki Iwamura, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 126 days.

(21) Appl. No.: 16/038,272

(22) Filed: Jul. 18, 2018

(65) Prior Publication Data
US 2019/0094049 A1  Mar. 28, 2019

(30) Foreign Application Priority Data
Sep. 25, 2017 (JP) .................. 2017-184201

(51) Int. Cl.
*G01D 5/353* (2006.01)

(52) U.S. Cl.
CPC ..... *G01D 5/35335* (2013.01); *G01D 5/35364* (2013.01)

(58) Field of Classification Search
CPC ............ G01D 5/35335; G01D 5/35364
USPC ............ 250/227.14, 227.18, 227.23
See application file for complete search history.

(56) References Cited

U.S. PATENT DOCUMENTS 7,170,590 B2 * 1/2007 Kishida .................. G01B 11/16
250/227.14

OTHER PUBLICATIONS

K. Koizumi et al., "High-Speed Distributed Strain Measurement using Brillouin Optical Time-Domain Reflectometry Based-on Self-Delayed Heterodyne Detection", ECOC 2015, P.1.07, Sep. 2015.

* cited by examiner

Primary Examiner — Que Tan Le
(74) Attorney, Agent, or Firm — Rabin & Berdo, P.C.

(57) ABSTRACT

Object is to enable a directly-modulated semiconductor laser to be applied as a light source of probe light. A transmission unit configured to generate probe light; and a reception unit including a receiver-side optical bandpass filter that extracts a Stokes component of Brillouin backscattered light from backscattered light which is caused by the probe light in a measurement target optical fiber, and a self-delayed heterodyne interferometer that detects a change in a frequency shift amount of the Stokes component as a phase difference are included. The transmission unit includes a directly-modulated light source configured to generate an optical pulse, and a transmitter-side optical bandpass filter provided in a stage following the directly-modulated light source, and configured to transmit wavelength of an ON level of the optical pulse as the probe light, and block wavelength of an OFF level.

5 Claims, 5 Drawing Sheets

OPTICAL FIBER STRAIN MEASUREMENT APPARATUS AND OPTICAL FIBER STRAIN MEASUREMENT METHOD COMPRISING A TRANSMITTER-SIDE OPTICAL BANDPASS FILTER

CROSS REFERENCE TO RELATED APPLICATION(S)

This application is based upon and claims benefit of priority from Japanese Patent Application No. 2017-184201, filed on Sep. 25, 2017, the entire contents of which are incorporated herein by reference.

BACKGROUND

This invention relates to an optical fiber strain measurement apparatus and an optical fiber strain measurement method using Brillouin scattered light.

With the evolution of optical fiber communication, distributed optical fiber sensing, in which the optical fiber itself serves as a sensing medium, has become an active area of research. Representative distributed optical fiber sensing is optical time domain reflectometry (OTDR), in which optical pulses are incident on an optical fiber from one end of the optical fiber, and light backscattered within the optical fiber is measured with respect to time. Backscattering in an optical fiber includes Rayleigh scattering, Brillouin scattering, and Raman scattering. Among others, OTDR that measures spontaneous Brillouin scattering is referred to as Brillouin OTDR (BOTDR) (see, for example, K. Koizumi, et al., "High-Speed Distributed Strain Measurement using Brillouin Optical Time-Domain Reflectometry Based-on Self-Delayed Heterodyne Detection", ECOC 2015, P.1.07, Sep. 2015).

Brillouin scattering is observed at positions with the frequency shift of the order of GHz on Stokes and anti-Stokes sides with respect to the center frequency of the optical pulse incident on the optical fiber. The spectrum of Brillouin scattering is referred to as the Brillouin gain spectrum (BGS). The frequency shift and the spectral line width of the BGS are referred to as Brillouin frequency shift (BFS) and Brillouin line width, respectively. The BFS and the Brillouin line width vary depending on the material of the optical fiber and the wavelength of incident light. For example, in the case of a silica-based single-mode optical fiber, it is reported that the magnitude of the BFS and the Brillouin line width for a wavelength of 1.55 μm are approximately 11 GHz and approximately 30 MHz, respectively.

In addition, it is known that the BFS linearly changes at a rate of 500 MHz/% with respect to strain of an optical fiber. If this is converted into tensile strain and temperature, the tensile strain and the temperature respectively reach change amounts of 0.058 MHz/με and 1.18 MHz/° C. In BOTDR, it is therefore possible to measure changes in strain and temperature with respect to the longitudinal direction of an optical fiber. BOTDR has been attracting attention because BOTDR is usable for the purpose of monitoring large constructions represented by bridges and tunnels.

With reference to FIG. 5, a conventional optical fiber strain measurement apparatus will be described. FIG. 5 is a schematic block diagram illustrating the conventional optical fiber strain measurement apparatus.

A transmission unit 110 generates an optical pulse as probe light. The optical pulse generated by the transmission unit 110 is sent, via an optical circulator 20, to an optical fiber (measurement target optical fiber) 100 that is a measurement target. The backscattered light from the measurement target optical fiber 100 is sent to the receiver unit 30 via the optical circulator 20.

A receiver unit 30 includes a receiver-side optical bandpass filter (BPF) 32 and a self-delayed heterodyne interferometer 40. The self-delayed heterodyne interferometer 40 includes a splitter 42, an optical frequency shifter unit 43, a delay controller 48, a polarization controller 46, a multiplexer 50, a photodetector 60, a local oscillator 83, and a phase comparator 70.

The local oscillator 83 generates an electrical signal having a frequency $f_{AOM}$.

The splitter 42 receives, via the receiver-side optical BPF 32, and splits the Stokes component of Brillouin backscattered light, which is caused by the probe light in the measurement target optical fiber 100, into the two branches of a first light path and a second light path.

The optical frequency shifter unit 43 is provided in the first light path. The optical frequency shifter unit 43 uses the electrical signal having the frequency $f_{AOM}$ generated by the local oscillator 83 to provide a frequency shift of the frequency $f_{AOM}$ to the light propagating through the first light path. In addition, the delay controller 48 and the polarization controller 46 are provided in the second light path. The delay controller 48 provides a delay time ti to the light propagating through the second light path. The polarization controller 46 controls the polarization of the light propagating through the second light path.

The multiplexer 50 multiplexes the light propagating through the first light path and the light propagating through the second light path to generate multiplexed light.

The photodetector 60 performs heterodyne detection on the multiplexed light to generate a beat signal. The beat signal generated by the photodetector 60 is sent to the phase comparator 70 as a first electrical signal. In addition, an electrical signal generated by the local oscillator 83 is sent as a second electrical signal to the phase comparator 70.

The phase comparator 70 performs homodyne detection on the first electrical signal and the second electrical signal to generate a homodyne signal. Here, the first and second electrical signals are each a beat signal having the frequency $f_{AOM}$, so that homodyne detection on these electrical signals allows a change of $2\pi f_b \tau$ to be output as a phase difference. Here, $f_b$ represents the optical frequency of spontaneous Brillouin scattered light.

The transmission unit 110 of the conventional optical fiber strain measurement apparatus generates a rectangular optical pulse that is input into the measurement target optical fiber 100. To generate this optical pulse, the transmission unit 110 includes, for example, a continuous light source 112 which generates continuous light, and a modulator 114 that modulates this continuous light with an electrical pulse.

SUMMARY

Here, as a modulator (external modulator) that is provided separately from the light source of continuous light, an LN modulator that has an excellent extinction characteristic, an EA modulator that has a small operating voltage, or the like is used.

When the transmission unit includes a light source of continuous light and an external modulator, it is possible to generate an optical pulse that has an excellent extinction characteristic and less waveform deterioration.

Meanwhile, the external modulator is disposed in the stage following the light source, and thus not suitable to miniaturize the entire transmission unit. In addition, the price of each modulator is high, which leads to the problem that the entire apparatus costs more.

As means for solving this problem, a method is possible that uses a low-priced compact directly-modulated semiconductor laser.

Directly modulating a semiconductor laser, however, transiently varies the carrier density and photon density inside the semiconductor laser. This brings about wavelength chirping, which varies oscillation wavelength with time. Each of FIGS. 6A and B is a diagram illustrating an optical spectrum waveform (represented by a curve I in FIG. 6A) and an optical pulse waveform that undergo the wavelength chirping.

FIG. 6A illustrates wavelength with the horizontal axis, and signal intensity with the vertical axis. In addition, FIG. 6B illustrates time with the horizontal axis, and signal intensity with the vertical axis.

As illustrated in FIG. 6A, the optical spectrum waveform (represented by the curve I in FIG. 6A) has the peak (represented by II in FIG. 6A) corresponding to the ON level of an optical pulse, and the peak (represented by III in FIG. 6A) corresponding to the OFF level (noise). In addition, as illustrated in FIG. 6B, the influence of the OFF level (noise) of an optical pulse deteriorates the extinction characteristic.

Here, in BOTDR, the wavelength of Rayleigh scattered light is present at substantially the same position as the position of the peak corresponding to the ON level of an optical pulse, and the wavelength of Brillouin scattered light is present at substantially the same position as the position of the peak corresponding to the OFF level (noise) of an optical pulse.

It is therefore impossible to apply the directly-modulated semiconductor laser to BOTDR with no processing.

This invention has been devised in view of the problems above. An object of this invention is to provide an optical fiber strain measurement apparatus and an optical fiber strain measurement method to which a directly-modulated semiconductor laser can be applied as a light source of probe light.

To achieve the object described above, an optical fiber strain measurement apparatus according to this invention includes: a transmission unit configured to generate probe light; and a reception unit including a receiver-side optical bandpass filter that extracts a Stokes component of Brillouin backscattered light from backscattered light which is caused by the probe light in a measurement target optical fiber, and a self-delayed heterodyne interferometer that detects a change in a frequency shift amount of the Stokes component as a phase difference. Here, the transmission unit includes a directly-modulated light source configured to generate an optical pulse, and a transmitter-side optical bandpass filter provided in a stage following the directly-modulated light source, and configured to transmit wavelength of an ON level of the optical pulse as the probe light, and block wavelength of an OFF level.

In addition, an optical fiber strain measurement method according to this invention includes: generating probe light; separating and extracting a Stokes component of Brillouin backscattered light from backscattered light that is caused by the probe light in a measurement target optical fiber; and detecting, with a self-delayed heterodyne interferometer, a change in a frequency shift amount of the Stokes component as a phase difference. Here, the generating the probe light includes generating, with a directly-modulated light source, an optical pulse, and transmitting a wavelength component of an ON level of the optical pulse generated by the directly-modulated light source as probe light, and blocking wavelength of an OFF level of the optical pulse.

According to the optical fiber strain measurement apparatus and the optical fiber strain measurement method of this invention, providing a transmitter-side optical bandpass filter in the stage following a light source makes it possible to use a low-priced compact directly-modulated light source as a light source. The transmitter-side optical bandpass filter transmits the wavelength of the ON level of an optical pulse generated by a light source as probe light, and blocks the wavelength of the OFF level.

In addition, if a variable-wavelength optical bandpass filter is used as a receiver-side optical bandpass filter that extracts a Stokes component, changing optical pulse width makes it possible to maintain high reception sensitivity irrespective of a change in the wavelength band of Brillouin scattering.

DETAILED DESCRIPTION OF THE EMBODIMENT(S)

Figure 1:
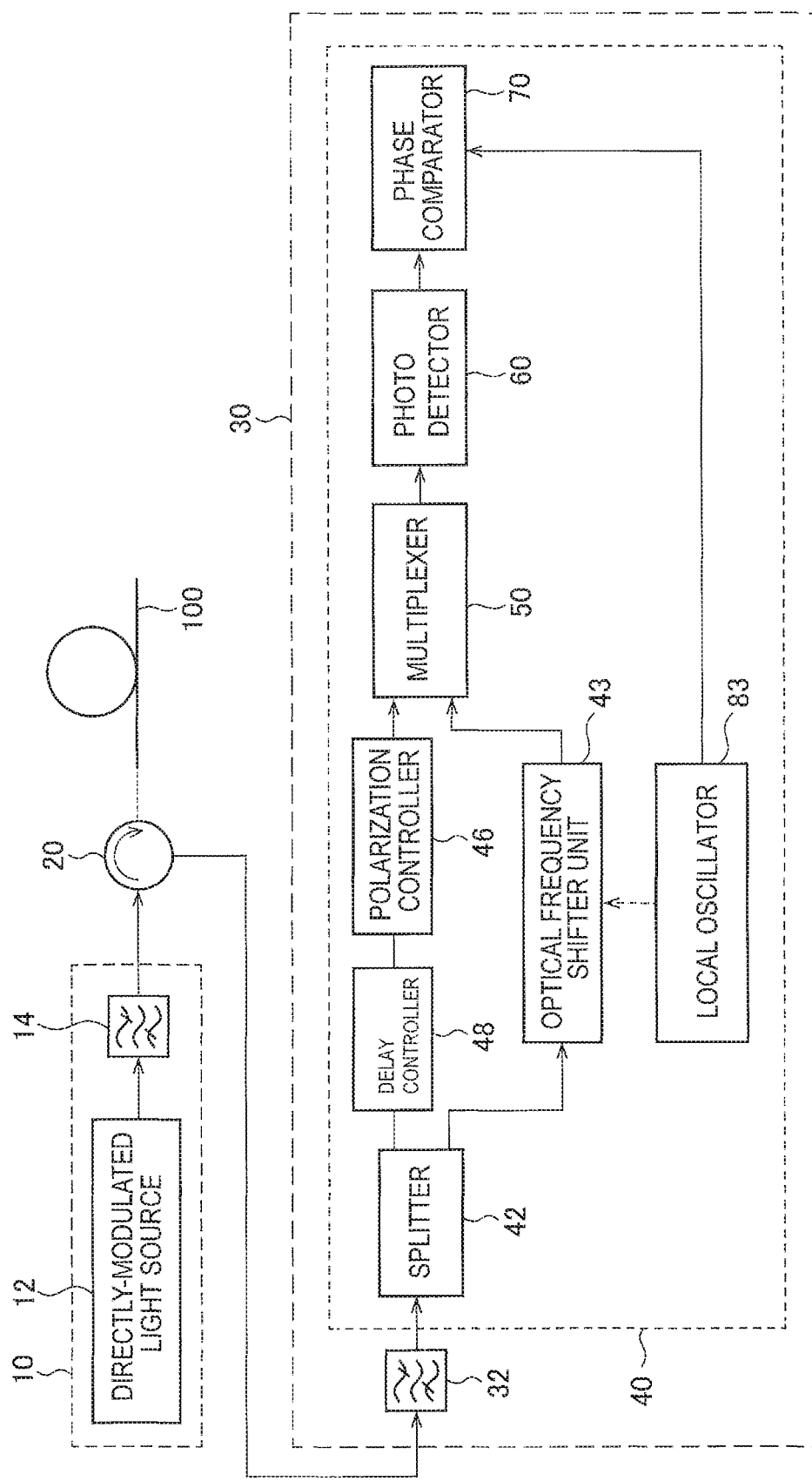
FIG. 1 is a schematic block diagram of an optical fiber strain measurement apparatus.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

First Embodiment

Figure 2A:
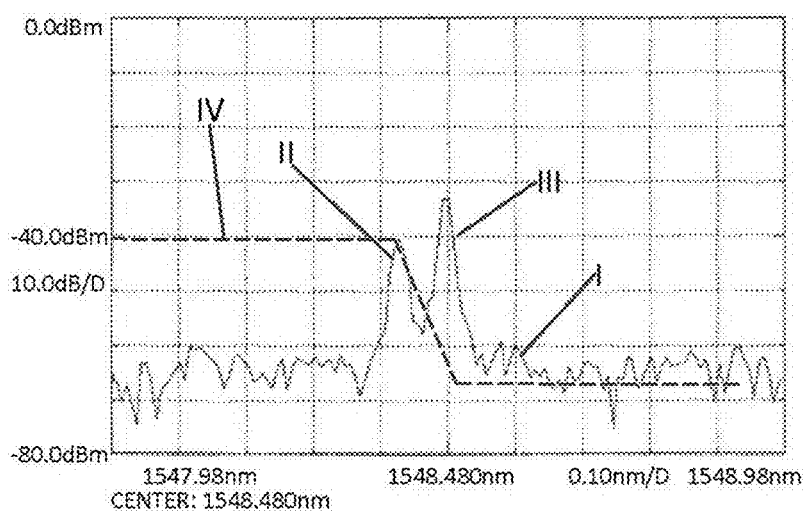
FIG. 2A is a diagram illustrating an optical spectrum waveform.
Figure 2B:
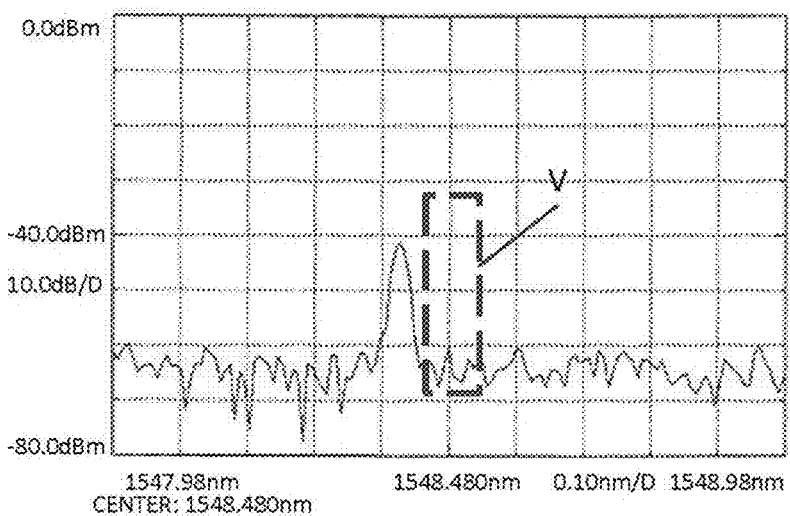
FIG. 2B is a diagram illustrating an optical spectrum waveform.
Figure 2C:
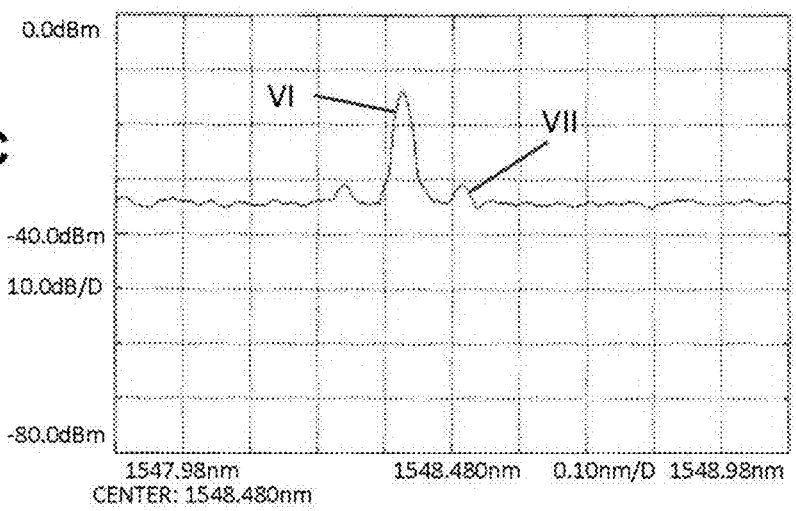
FIG. 2C is a diagram illustrating an optical spectrum waveform.
Figure 3:
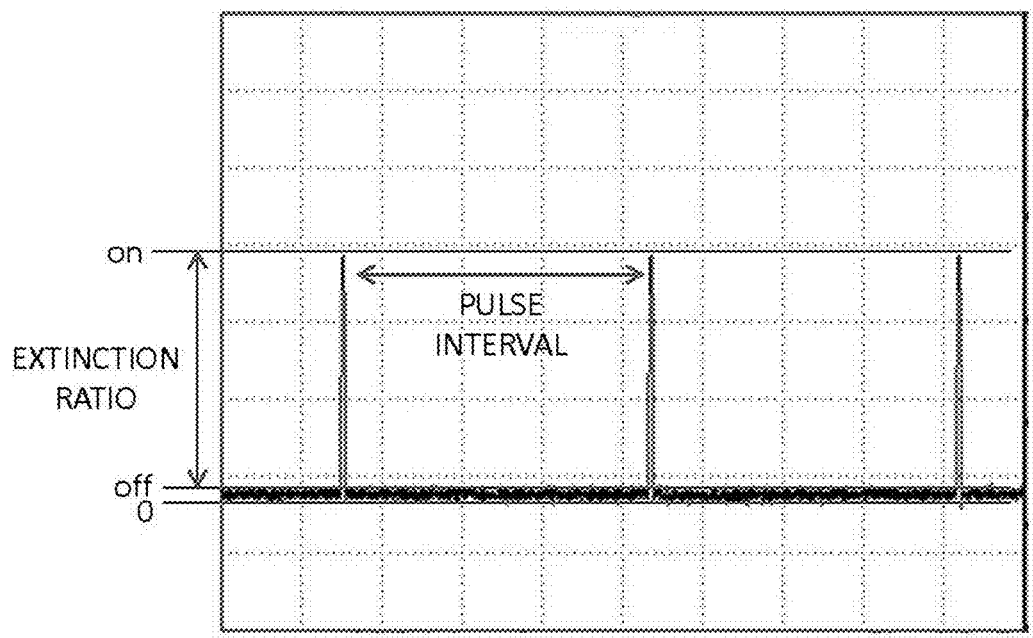
FIG. 3 is a diagram illustrating an optical pulse waveform output from a transmitter-side optical bandpass filter (BPF)

With reference to FIGS. 1 to 3, a first embodiment of an optical fiber strain measurement apparatus according to this invention will be described. FIG. 1 is a schematic block diagram of the first embodiment of the optical fiber strain measurement apparatus. FIG. 2 is a diagram illustrating an optical spectrum waveform. FIGS. 2A to C each illustrate wavelength with the horizontal axis, and signal intensity with the vertical axis. FIG. 2A illustrates an optical spectrum waveform output from a directly-modulated light source described below. FIG. 2B illustrates an optical spectrum waveform output from a transmitter-side optical bandpass filter (BPF). FIG. 2C illustrates the optical spectrum waveform of backscattered light. FIG. 3 is a diagram illustrating an optical pulse waveform output from the transmitter-side optical bandpass filter (BPF). FIG. 3 illustrates time with the horizontal axis, and signal intensity with the vertical axis.

An optical fiber strain measurement apparatus (which will also be referred to simply as measurement apparatus below) according to the first embodiment includes a transmitter unit 10, an optical circulator 20, and a receiver unit 30.

The transmitter unit 10 generates probe light. The transmitter unit 10 includes a directly-modulated light source 12 and a transmitter-side optical BPF 14. The directly-modulated light source 12 includes, for example, a directly-modulated semiconductor laser. The optical spectrum waveform (represented by a curve I in FIG. 2A) of this directly-modulated light source 12 has not only the peak (represented by II in FIG. 2A) corresponding to the ON level of an optical pulse, but also the peak (represented by III in FIG. 2A) corresponding to the OFF level (noise).

The transmitter-side optical BPF 14 is provided in the stage following the directly-modulated light source 12. The transmitter-side optical BPF 14 transmits the wavelength corresponding to the ON level in the output of the directly-modulated light source 12, and blocks the wavelength corresponding to the OFF level. For example, it is possible in FIG. 2A to apply a filter having an edge roll off slope represented by a dashed line IV. In the example shown as the dashed line IV, the edge roll off slope is approximately 312.5 dB/nm, and can be configured, for example, by disposing a fiber Bragg grating (FBG) filter in a single stage or multi-stage manner. The flat top region of the transmitter-side optical BPF 14 only has to transmit the wavelength corresponding to the ON level, and can be preferably set in any manner.

Figure 6A:
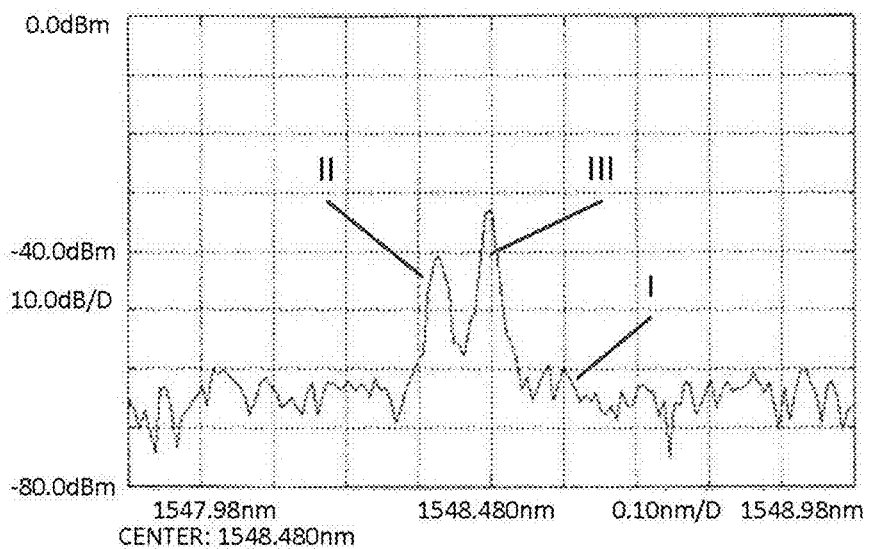
FIG. 6A is a diagram illustrating an optical spectrum waveform that undergoes wavelength chirping.
Figure 6B:
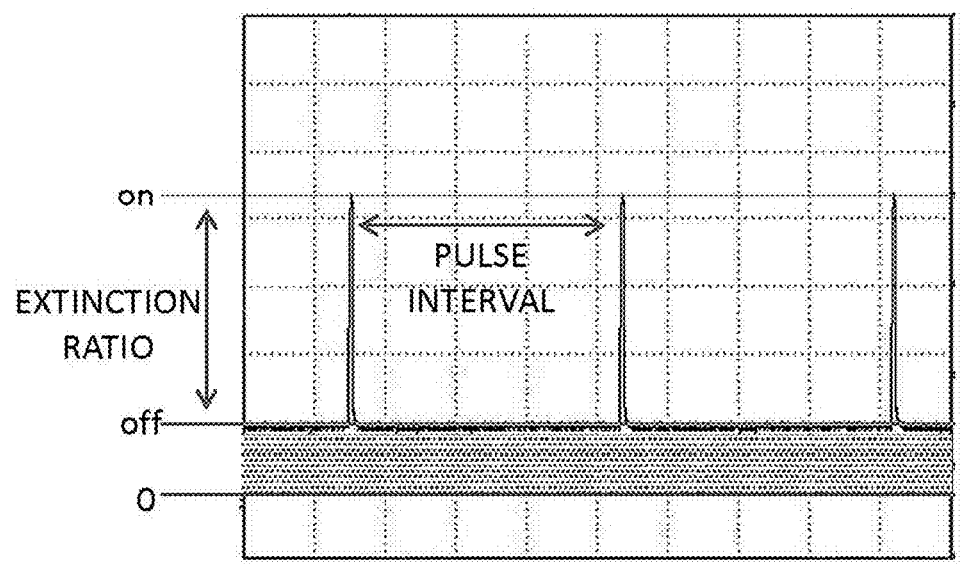
FIG. 6B is a diagram illustrating an optical pulse waveform that undergoes wavelength chirping.

In the output of the transmitter-side optical BPF 14, as shown as a dashed line V in FIG. 2B, the peak corresponding to the OFF level (noise) as in FIG. 2A is removed. In addition, FIG. 3 illustrates that the transmitter-side optical BPF 14 blocks the wavelength component of the OFF level (noise) to improve the extinction characteristic as compared with FIG. 6B.

The optical pulse passing through the transmitter-side optical BPF 14 is output from the transmitter unit 10 as probe light.

The probe light output from the transmitter unit 10 is incident on the measurement target optical fiber 100 via the optical circulator 20. Note that an optical coupler and an isolator may be combined and used instead of the optical circulator 20.

The backscattered light from the measurement target optical fiber 100 is sent to the receiver unit 30 via the optical circulator 20. The backscattered light includes the component of Rayleigh scattering (represented by VI in FIG. 2C) and the component of Brillouin scattering (represented by VII in FIG. 2C). The component of Rayleigh scattering is present at substantially the same position as the position of the peak corresponding to the ON level of an optical pulse, and the component of Brillouin scattering is present at substantially the same position as the position of the peak corresponding to the OFF level (noise) of an optical pulse, but the use of the configuration of this transmitter unit 10 allows the Brillouin scattering to be measured.

The receiver unit 30 includes the receiver-side optical bandpass filter (BPF) 32 and the self-delayed heterodyne interferometer 40. The self-delayed heterodyne interferometer 40 includes the splitter 42, the optical frequency shifter unit 43, the delay controller 48, the polarization controller 46, the multiplexer 50, the photodetector 60, the local oscillator 83, and the phase comparator 70.

The receiver-side optical BPF 32 separates and extracts the Stokes component of Brillouin backscattered light from backscattered light. The Stokes component is sent to the splitter 42.

A signal $E_0(t)$ of the spontaneous Brillouin scattered light emitted from the receiver-side optical BPF 32 at time t is expressed by an equation (1) below.

$$E_0(t)=A_0\exp\{j(2\pi f_b t+\varphi_0)\} \quad (1)$$

Here, $A_0$ represents amplitude, $f_b$ represents the optical frequency of the spontaneous Brillouin scattered light, and $\varphi_0$ represents an initial phase.

The local oscillator 83 generates an electrical signal having the frequency $f_{AOM}$.

The splitter 42 receives, via the receiver-side optical BPF 32, and splits the Stokes component of Brillouin backscattered light, which is caused by the probe light in the measurement target optical fiber 100, into the two branches of a first light path and a second light path.

The optical frequency shifter unit 43 is provided in the first light path. The optical frequency shifter unit 43 uses the electrical signal having the frequency $f_{AOM}$ generated by the local oscillator 83 to provide a frequency shift of a beat frequency $f_{AOM}$ to the light propagating through the first light path.

In this configuration example, the polarization controller 46 is provided in the second light path. The polarization controller 46 controls the polarization of the light propagating through the second light path, for example, so as to maximize the peak intensity measured by the photodetector 60.

In this configuration example, the delay controller 48 is provided in the second light path. The delay controller 48 provides the delay time ti to the light propagating through the second light path. Note that, the delay controller 48 is configured in any way as long as the delay controller 48 provides the delay time ti to the light propagating through the second light path as compared to the light propagating through the first light path. For example, when the polarization controller 46 functions as a delayer, there is no need to provide a delayer separately. In addition, a so-called delay line can also be provided.

The delay controller 48, the polarization controller 46, and the optical frequency shifter unit 43 only have to execute the respective functions described above, and may be provided in any of the first light path and the second light path.

The multiplexer 50 multiplexes the light propagating through the first light path and the light propagating through the second light path to generate multiplexed light. An optical signal $E_1(t)$ propagating through the first light path and an optical signal $E_2(t-\tau)$ propagating through the second light path which are incident on the multiplexer 50 are respectively expressed by equations (2) and (3) below.

$$E_1(t)=A_1\exp\{j(2\pi f_b t+2\pi f_{AOM}t+\varphi_1)\} \quad (2)$$

$$E_2(t-\tau)=A_2\exp[j\{2\pi f_b(t-\tau)+\varphi_2\}] \quad (3)$$

Here, $A_1$ and $A_2$ are the amplitudes of $E_1(t)$ and $E_2(t-\tau)$, respectively, and $\varphi_1$ and $\varphi_2$ are the initial phases of $E_1(t)$ and $E_2(t-\tau)$, respectively.

The photodetector 60 performs heterodyne detection on the multiplexed light to generate a beat signal. The photodetector 60 includes, for example, a balanced photodiode and an FET amplifier. A beat signal I provided by heterodyne detection is expressed by an equation (4) below.

$$I_{12}=2A_1A_2\cos\{2\pi(f_{AOM}+f_b\tau)+\varphi_1-\varphi_2\} \quad (4)$$

The beat signal generated by the photodetector 60 is sent to the phase comparator 70 as the first electrical signal. In addition, an electrical signal generated by the local oscillator 83 is sent as a second electrical signal to the phase comparator 70.

The phase comparator 70 performs homodyne detection on the first electrical signal and the second electrical signal to generate a homodyne signal. Here, the first and second electrical signals are each a beat signal having the frequency $f_{AOM}$, so that homodyne detection on these electrical signals allows a change of $2\pi f_b \tau$ to be output as a phase difference. A Brillouin frequency $f_b$ is changed by the two factors of fluctuations in the oscillation frequency of the light source 12 and strain of the measurement target optical fiber 100. However, the influence of strain of the measurement target optical fiber 100 is dominant because a frequency-stabilized laser is used as the light source 12. Here, the phase comparator 70 includes a personal computer (PC), but may include an analog device.

Second Embodiment

If the data amount becomes larger with prolonged delay or the like, BOTDR sometimes lowers spatial resolution to reduce the number of samples. To lower spatial resolution, it is necessary to expand optical pulse width.

Figure 4:
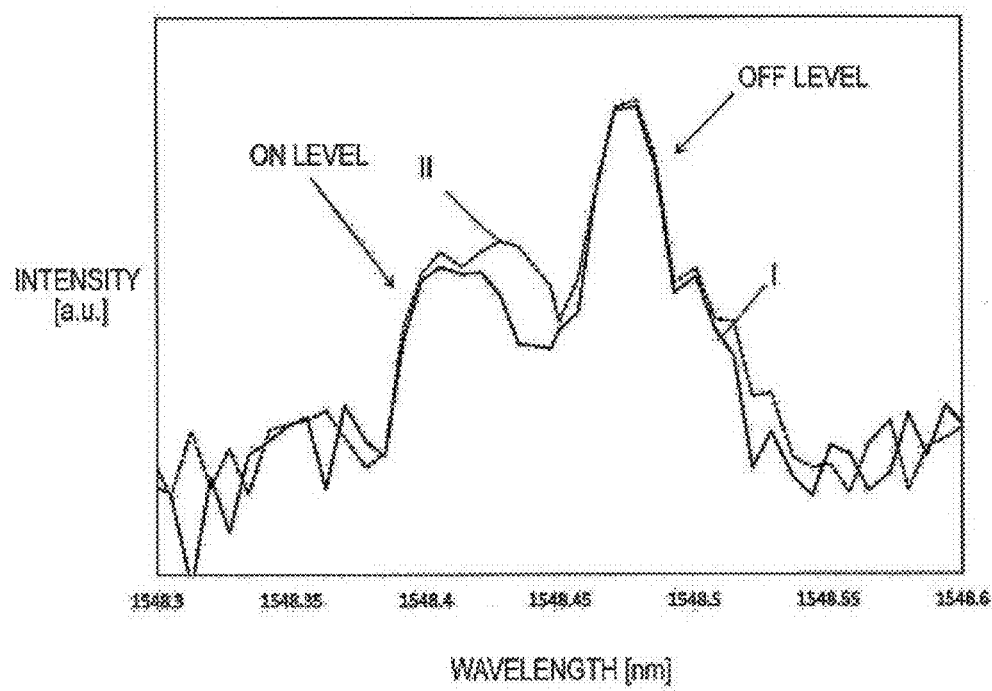
FIG. 4 is a diagram illustrating an optical spectrum waveform when optical pulse width changes.
Figure 5:
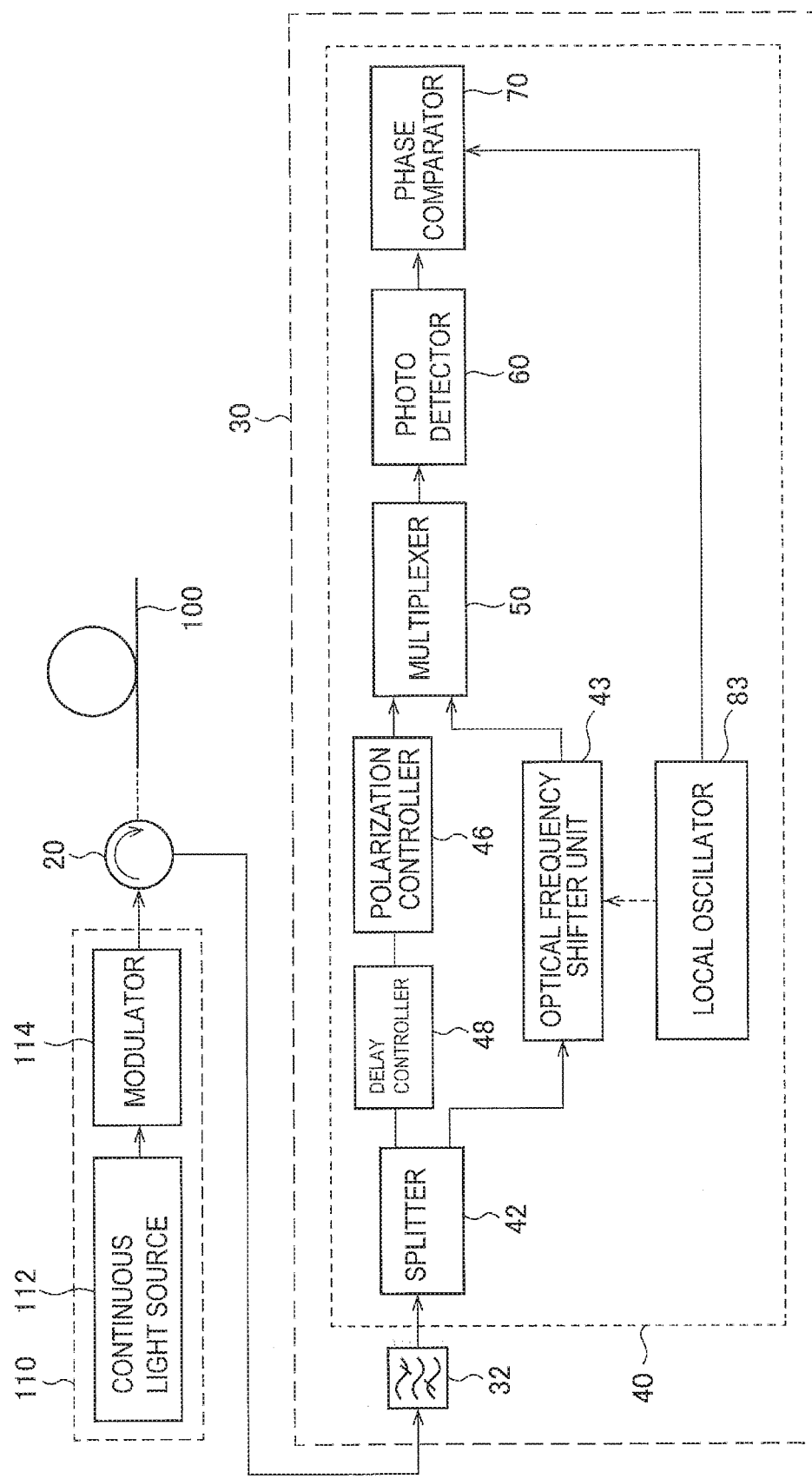
FIG. 5 is a schematic block diagram of a conventional optical fiber strain measurement apparatus.

Here, a change in optical pulse width changes the duty cycle of a signal, and changes the wavelength corresponding to the ON level. FIG. 4 is a diagram illustrating an optical spectrum waveform when optical pulse width changes.

In FIG. 4, the case of an optical pulse width of 31.25 ns is represented by a curve I, and the case of an optical pulse width of 50 ns is represented by a curve II.

If optical pulse width is expanded, the peak of the ON level approaches the peak of the OFF level (noise). That is, the wavelength of probe light changes, and thus the wavelength band of Brillouin scattering also changes.

Therefore, an optical fiber strain measurement apparatus according to a second embodiment includes a variable-wavelength optical BPF as the receiver-side optical BPF 32. This allows Brillouin scattering to be measured irrespective of a change in the wavelength of probe light.

Note that, if pulse width is expanded and the peak of the ON level approaches the peak of the OFF level (noise), it is preferable that the transmitter-side optical BPF 14 have a sharper edge roll off slope. To this end, the transmitter-side optical BPF 14 only has to include, for example, a plurality of FBG filters. In addition, the number of FBG filters through which an optical pulse passes may be changed in accordance with the pulse width.

Another Configuration Example

Although each of the above-described embodiments has been described with reference to an example in which the optical frequency shifter unit is provided in one of the two light paths of the self-delayed heterodyne interferometer 40, the present invention is not limited to this example. For example, a first optical frequency shifter unit that provides a frequency shift of a first frequency $f_1$ may be provided in the first light path while a second optical frequency shifter unit that provides a frequency shift of a second frequency $f_2$ ($\neq f_1$) may be provided in the second light path. In this case, there are provided two local oscillation electrical signal sources one of which generates an electrical signal of the first frequency $f_1$ and the other of which generates an electrical signal of the second frequency $f_2$. In addition, difference frequency components of these two electrical signals can be used for the second electrical signal.

Heretofore, preferred embodiments of the present invention have been described in detail with reference to the appended drawings, but the present invention is not limited thereto. It should be understood that they will naturally come under the technical scope of the present invention.

What is claimed is:

1. An optical fiber strain measurement apparatus comprising:
 a transmission unit configured to generate probe light; and
 a reception unit including a receiver-side optical bandpass filter that extracts a Stokes component of Brillouin backscattered light from backscattered light which is caused by the probe light in a measurement target optical fiber, and a self-delayed heterodyne interferometer that detects a change in a frequency shift amount of the Stokes component as a phase difference, wherein
 the transmission unit includes
  a directly-modulated light source configured to generate an optical pulse, and
  a transmitter-side optical bandpass filter provided in a stage following the directly-modulated light source, and configured to transmit wavelength of an ON level of the optical pulse as the probe light, and block wavelength of an OFF level.

2. The optical fiber strain measurement apparatus according to claim 1, wherein
 the receiver-side optical bandpass filter is a variable-wavelength optical bandpass filter.

3. The optical fiber strain measurement apparatus according to claim 1, wherein
 the self-delayed heterodyne interferometer includes
  a splitting unit configured to split the Stokes component into two branches of a first light path and a second light path,
  an optical frequency shifter unit provided in any of the first light path and the second light path, and configured to provide a frequency shift of a beat frequency,
  a delayer provided in any of the first light path and the second light path,
  a multiplexing unit configured to multiplex light propagating through the first light path and light propagating through the second light path to generate multiplexed light,
  a light receiver configured to perform heterodyne detection on the multiplexed light, and output a difference frequency as a first electrical signal,
  a local oscillation electrical signal source configured to generate a second electrical signal having a same frequency as a frequency of the first electrical signal, and
  a phase comparator configured to perform homodyne detection on the first electrical signal and the second electrical signal, and output a change in a frequency shift amount as a phase difference.

4. The optical fiber strain measurement apparatus according to claim 1, wherein
 the self-delayed heterodyne interferometer includes
  a splitting unit configured to split the Stokes component into two branches of a first light path and a second light path,
  a first optical frequency shifter unit provided in the first light path, and configured to provide a frequency shift of a first frequency, a second optical frequency shifter unit provided in the second light path, and configured to provide a frequency shift of a second frequency, a delayer provided in any of the first light path and the second light path, a multiplexing unit configured to multiplex light propagating through the first light path and light propagating through the second light path to generate multiplexed light, a light receiver configured to perform heterodyne detection on the multiplexed light, and output a difference frequency as a first electrical signal, a local oscillation electrical signal source configured to generate a second electrical signal having a same frequency as a frequency of the first electrical signal, and a phase comparator configured to perform homodyne detection on the first electrical signal and the second electrical signal, and output a change in a frequency shift amount as a phase difference.

5. An optical fiber strain measurement method comprising:

generating probe light;

separating and extracting a Stokes component of Brillouin backscattered light from backscattered light that is caused by the probe light in a measurement target optical fiber; and detecting, with a self-delayed heterodyne interferometer, a change in a frequency shift amount of the Stokes component as a phase difference, wherein the generating the probe light includes generating, with a directly-modulated light source, an optical pulse, and transmitting a wavelength component of an ON level of the optical pulse generated by the directly-modulated light source as probe light, and blocking wavelength of an OFF level of the optical pulse.

* * * * *